though the more commonly encountered types produce only poor to fair results with basic copolymers of group (B), while direct, developed and vat dyes produce poor results on such basic copolymers. This invention is particularly concerned with basic copolymers, as will be noted below.

United States Patent Office 3,124,412
Patented Mar. 10, 1964

3,124,412
CONTINUOUS DYEING METHOD FOR FIBROUS MATERIALS AND COMPOSITIONS THEREFOR
Louis I. Fidell, Bound Brook, and Jerry M. Mecco, Somerville, N.J., assignors to American Cyanamid Company, New York, N.Y., a corporation of Maine
No Drawing. Filed July 14, 1960, Ser. No. 42,750
16 Claims. (Cl. 8—54)

The present invention relates to a continuous process for coloring nitrogenous materials with available dyes which previously could not be so utilized. More particularly, it is concerned with a continuous process for coloring hydrophobic nitrogenous fibrous materials. Still more specifically, the invention also presents novel pad- and developing-baths, whereby such nitrogen-containing materials may be colored with conventional dyes and which cause the dyes to "strike" and penetrate the materials rapidly, of the order of 0.5 to five minutes, giving excellent penetration. Resultant dyeings are characterized by excellent levelness and exceptional fastness properties. They exhibit no physical damage to the material.

In general, the present invention may be used to color nitrogenous materials in various physical forms. These include, for example, sheets, films, rods, tubes, bristles and the like. However, its most commonly-encountered applications are in dyeing fibers, yarns and fabrics. Therefore, these fibrous structures will be taken as illustrative herein. For purposes of simplifying their identification, they will be referred to generally as "nitrogenous fibers." However, it will be understood that this term is intended to include the various physical forms noted above.

As contemplated by the present invention, the term "nitrogenous fibers" includes both natual and synthetic materials, most of the latter being synthetic organic, hydrophobic materials. Accordingly, these fibers may be classified generally into the two broad groups of (A) proteins and as (B) synthetics. As used in this discussion, group (A) includes both natural and synthetic proteins, and group (B) includes various types of synthetic, organic, nitrogen-containing polymeric fibers derived from a polymerizable mixture containing at least 5% of a "basic nitrogen" modifier.

The first and older group, group (A) is usually more more precisely defined as a "basic" nitrogen-containing group, wherein the nitrogen is present in a basic form. This group includes natural protein fibers such as wool, mohair, fur, hair, alpaca, real silk, Tussah silk and the like. It also includes synthetic protein fibers such as those derived from corn, peanuts, and the like. The natural fibers are referred to below as type (1); the synthetics as type (2).

In recent years, industry has developed a large number of varied synthetic fibers, each having desirable properties. Some of these comprise group (B) of this invention. It includes various super-polyamides, known generally in the trade as nylons. They are referred to below as type (3).

Others include those generally known as acrylic fibers, many being polymers or copolymers of acrylonitrile. These include such typical illustrative copolymers as those of acrylonitrile and vinyl pyridine; acrylonitrile, vinyl acetate and vinyl pyridine; copolymers of vinylidine cyanide, methyl vinyl pyridine and vinyl acetate; combinations of these copolymers; and acrylonitrile fibers wet spun from concentrated aqueous thiocyanate solutions. These are referred to below as type (4). The remaining group is often referred to in the trade as "modified" acrylic or "modacrylic" fibers. These will be referred to herein as type (5) and are illustrated, for example, by copolymers such as those of acrylonitrile and vinyl pyrrolidone; acrylonitrile and vinylidine chloride; acrylonitrile, vinylidine chloride and polyvinyl pyrrolidone; and the like.

Use above of the words "nylon," "acrylic" and "modacrylic" in referring to fibers of types (3) (4) and (5), respectively, is in accord with the definitions of the Federal Trade Commission. They were established under Public Law 85–897, "Textile Fiber Products Identification Act," approved Sept. 2, 1958, and as published March 3, 1959, in the "Official Gazette" (740 O.G. 2).

Despite the varied, but advantageous, properties of these natural and synthetic fibers, in the past there has been available no satisfactory rapid or continuous process by which they can be colored. This problem has proved particularly troublesome with respect to the synthetics of group (B) which in general are the most difficult to dye. It is especially aggravated in the case of certain acrylic copolymers, i.e., those "basic" copolymers which comprise at least 70% by weight of polymerized acrylonitrile and also contain at least one copolymerized "basic" comonomer.

COLORING REQUIREMENTS

Coloring of fibrous materials encompasses, among others, at least two critical requisites. The first comprises removal of dye from an aqueous bath and depositing it upon the fiber. The amount deposited in the first few seconds is termed the "strike." It is related to the "affinity" of the dye for the fiber. When two or more dyes are present, the dye first sorbed, or sorbed to the greater extent, by the fiber is that having the higher affinity, i.e., "strike." Obviously, the greater the affinity between dye and fiber, the more rapid is the transfer of dye from the bath to the fiber and the more firmly will it cling to the fiber after it has been sorbed. The second is producing uniform sorption of dye by the fiber. Otherwise a heathery or skittery appearance is imparted to the material. Uniform "sorption" connotes a lower affinity or lower strike.

Unfortunately, these two features present conflicting problems. It is always desirable to reduce the time period required in dyeing. This demands greater affinity and more rapid sorption of the dye, causing the dye to be held more tenaciously by the fiber. But conversely, producing a level dyeing having a solid shade is favored when dyes are sorbed slowly and have a lower affinity for the fiber so that they can dye "off-and-on."

In order to compromise between these conflicting requirements, current procedures start the dyeing process at about room temperatures, gradually bringing the temperature up to the boil over a period of 20–45 minutes. Finally, dyeing is completed at the boil, usually requiring another 45 minutes or more for the natural fibers of group (A). For the synthetic hydrophobic fibers of group (B), a typical dyeing procedure may require several hours. These conditions reduce the affinity or strike of the dye, permit slow sorption in the initial stages, and allow the color to dye off-and-on. Thereby good solid, level shades are obtained at the expense of time. Moreover, such procedures are not adaptable to continuous operation.

A third feature which is less critical, is the desirability of obtaining a maximum penetration of the dye into the fiber. Complete penetration is not always possible and may or may not occur during a particular dyeing operation. When obtainable, it appreciably adds to the quality of a dyeing and maximum fastness of the dyed material results.

Since the primary purpose of a process in accordance with this invention is to obtain rapid dyeing of fibers of types (1) to (5) using commercially-available dyes, it should be noted that to be considered successful, it also must meet certain additional criteria. It must be capable of producing the desired level dyeing in less than about ten minutes. It must be adapted to continuous operation to avoid the multiple fiber handling required in batch processes, enabling savings in time and expense.

Even more important, it should avoid physical damage to the fibers. This is especially important with respect to group (B) since it must not remove the vital "crimp" imparted to these fibers during their manufacture in order to provide a certain amount of elasticity or extensibility. This is an absolute requirement in throwing and weaving operations and in the subsequent use of the fabric. Without this extensibility the fiber, yarn or fabric is void of the "life" which the consumer demands. Consequently, one of the most important steps in the manufacture of synthetic, hydrophobic, nitrogenous textile fibers of group (B) is the "crimping" operation. It is not sufficient merely to put this crimp in. The dyeing process must not remove it.

In view of the commercial importance of the fibers of types (1) through (5) and of the contemplated dyestuffs, there has been a long-standing need for a satisfactory continuous process. Surprising, such a process for dyeing the presently contemplated fibers with the desired dyes has not been available.

TYPES OF UTILIZABLE DYESTUFFS

As noted above, one of the purposes of this invention is to provide a process by which nitrogenous fibers of types (1) to (5) can be quickly and readily dyed, making use of known, available dyestuffs which previously could not be so employed. To this end, it is contemplated that this invention may utilize a wide selection among various types of the presently available dyestuffs.

Commercially-available dyes, suitable for use in coloring the fibers of types (1)–(5) in accordance with the present invention may be classified in various ways. In this discussion they are divided into two groups which may be characterized as follows.

*Dye group (I).*—This group includes dyes in which the color is imparted by the negatively-charged portion of the molecule. In this invention these may be represented, for example, by the acid dyes, milling dyes, many direct dyes, many azo dyes, metalized and metalizable dyes, and certain reactive dyes containing halogens. It should be noted that vat dyes and sulfur dyes also may be classified within this group. However, these latter two classes and their use are not contemplated as a part of this invention.

*Dye group (II).*—This group includes those dyes in which the color is imparted by the positively-charged portion of the molecule. These dyes are "cationic-type" dyes and include basic dyes and many of the so-called "acrylic" dyes.

Even more surprising is the fact that despite the long-felt need for such a process, it now has been provided in the present invention and to a surprisingly successful degree. It provides a relatively simple, continuous, dyeing process for nitrogenous fibers of both groups (A) and (B). It produces (a) rapid strike, (b) level shades, (c) surprisingly good penetration of the fiber by the dye. Good dyeings in as little as 0.5 to 5 minutes are easily obtained. Last, but not least, no observable damage to the fibers is produced.

In general terms, the continuous dyeing process of this invention may be simply described. The fibers, in continuous form such as threads, yarns, fabrics and the like are subjected to the following steps:

(1) Wetting out at about room temperature in a suitable pad-bath containing the desired dyestuff;
(2) Removal of the excess padding liquor;
(3) Without drying, passing the resultant wet out fiber directly into a hot developing-bath which is maintained at from about 200° to 220° F. to develop the color, and
(4) Continuing the developing-bath treatment for sufficient time, usually from about one-half to about five minutes.

Thereafter, the treated fiber is freed from developing-bath liquor in a series of rinsing, washing, and rinsing steps and finally is dried. Since these latter steps, though necessary, are usually carried out in a substantially conventional manner, they need not necessarily be considered patentable features of the process of the present invention.

The composition of the pad-baths and of the developing-baths to be in accordance with this invention will vary to a considerable extent on the nature of the fiber and the type of dyestuff to be used. To obtain the best results, a selection of the preferred pad-bath for the particular dye must be made from one of three types of composition which for purposes of this discussion have been grouped in the following way.

Pad-bath-type (A) for the use of group (I) dyes for coloring fibers of types (1) through (4). It is characterized by the use of an acid dyeing assistant, usually formic acid; and a hot, acidic developing-bath.

Pad-bath-type (B) for the use of group (I) dyes in coloring type (5) fibers. It is characterized by the use of a dye-assistant salt and a hot, saturated, salt developing-bath.

Pad-bath-type (C) for the use of group (II) dyes in coloring fibers of types (1) through (4), particularly those of type (4). It is accompanied by the use of a hot developing-bath containing an alkali metal phosphate and having a pH of from about 9.5 to about 7.

The present invention will be further developed in conjunction with the following more specific discussion and the accompanying illustrative examples of the use of each pad-bath type. Therein, unless otherwise noted, all parts and percentages are by weight and all temperatures are in degrees Fahrenheit. Concentration percentages in the bath are based on the total weight of the bath, unless otherwise noted. Where, as in some cases, percentage is based on the weight of the fiber, it is noted by the abbreviation (owf.).

In the following discussion, and examples also, certain specific group (B) fibers are tested. For purposes of identification, they have been designated as fibers A, B, C, D, E, F, G, and H, respectively. These designations are used to identify fibers having the following compositions.

Fiber A is a commercially-available, acrylic copolymer of type (4) derived from a mixture containing about 85% acrylonitrile and about 7.5% each of vinyl acetate and monovinyl pyridine.

Fiber B is a commercially-available, acrylic copolymer of type (4) derived from a mixture containing about 89% acrylonitrile and about 5.5 each of vinyl acetate and monovinyl pyridine.

Fiber C is a commercially-available, acrylic copolymer of type (4) derived from a mixture containing about 90% acrylonitrile and about 5% each of vinyl acetate and monovinyl pyridine.

Fiber D is a commercially-available, copolymer of type (4) fiber derived from a mixture containing about 6% monovinyl pyridine and about 47% each of vinyl acetate and vinylidine cyanide.

Fiber E is a commercially-available polyamide fiber of type (3) derived from hexamethylene diamine and adipic acid.

Fiber F is a commercially-available, self-condensation fiber of type (3) derived from 6-aminohexanoic acid.

Fiber G is a commercially-available, modified-acrylic fiber of type (5) derived from a mixture containing about 14% polyvinyl pyrrolidone and about 43% each of polyacrylonitrile and vinylidine chloride.

Fiber H is a commercially-available modified-acrylic fiber of type (5) derived from a mixture containing about 85% acrylonitrile and about 15% vinyl pyrrolidone.

It is to be understood these eight fibers were selected for purposes of illustration of the several types (3) through (5) and that the process of the present invention is not necessarily limited to dyeing these specific fibers.

USAGE OF PAD-BATH-TYPE (A)

Bath Composition

A typical pad-bath of this type will contain (a) an anionic dye of group (I), (b) a highly-ionizable acid, and (c) a dyeing assistant. Any of the above-noted anionic dyes which can be applied from an acid solution are useful. In this invention, these include acid dyes; milling dyes; direct dyes containing sulfonic acid groups; metalizable dyes, i.e., azo dyes that contain o,o'-dihydroxy groups, o-hydroxy-o'-carboxy groups, or o-hydroxy-o'-amino groups; reactive dyes; and premetalized dyes of either the acid-dyeing or neutral-dyeing types.

In general, the amount of dye added to the pad-bath will vary depending upon the depth of shade required. Usually a dye concentration of from about 0.5% to about 3% of dye is sufficient. However, it is not intended to limit this invention to these amounts.

Various highly-ionizable acids may be used in accordance with the process of this invention. Formic acid is usually preferred, due to its effectiveness and availability. Other acids which may be used include acetic, hydroxyacetic, chloracetic, propionic, malonic, succinic, glutaric, benzene sulfonic, o-, m-, and p-toluene sulfonic acids; anhydrides of the aforementioned acids, such as acetic anhydride, and the like. In general, from about 0.5% to about 2.5% of the acid may be used. Ordinarily, use of about 1% to 2% will be found to be a good practice.

Examples of suitable dyeing assistants include such organic solvents as butanol, trichlorobenzene, paradichlorobenzene, toluene, xylene and the like; and lower alkyl esters of carbocyclic, aromatic monocarboxylic acids, having one or two carbocyclic rings such as methyl salicylate, methyl benzoate, isopropyl benzoate, butyl benzoate, amyl benzoate, beta-methoxyethyl benzoate, methyl 2-chlorobenzoate, methyl-p-tertiarybutyl benzoate, methyl ester of 3-hydroxy-2-naphthoic acid, ethyl ester of 3-hydroxy-2-naphthoic acid, methyl p-nitrobenzoate, methyl p-hydroxybenzoate, methyl 2,4-dihydroxybenzoate, methyl 3,4-dichlorobenzoate, methyl p-aminobenzoate, methyl 3,4,5-trimethoxy benzoate, methyl trimethyl gallate, methyl p-phenylbenzoate, methyl o-benzoylbenzoate and the like.

Since most of these compounds have low solubility in water, a necessary prerequisite in the use of such a compound is that it be emulsified in an aqueous solution. This may be done by any desired procedure which forms the emulsion with the assistant in the inner phase, as for example the procedures outlined in U.S. Patent 2,881,045, issued April 7, 1959. It is also within the scope of this invention to use a combination of the above dyeing assistants, as for example by dissolving a dyeing assistant of low water solubility in a solvent assistant such as xylene, toluene or butanol and then emulsifying the resultant solution, or by emulsifying mixtures of two or more liquid or solid assistants.

The amount of dyeing assistant required is related to the amount of dye present in the pad-bath. Usually an amount equivalent to about 1-4% of an aqueous emulsion containing about 50% of dyeing assistant is satisfactory. From about 1.5-3% is generally preferred and will be found a good general practice. Equivalent amounts, depending upon the concentration of the emulsion, may be substituted.

Removal of Pad-Bath Liquor

Padding consists in entering the fibers into a cold pad-bath maintained at about ambient room temperature and holding the fibers therein until they are thoroughly wet out. After the padding operation is completed, excess pad-bath liquor is removed in conventional apparatus as by passing the wet material through a pair of squeeze rolls or over a vacuum slit in a suction pipe. In general the preferred expression should be about 100%; i.e., 100 parts of fibrous material should retain an average of about 100 parts of the pad-bath liquor. However, as will be understood by those familiar with dyeing practice, this amount may be raised or lowered if necessary or desirable so long as the wet fibers contain sufficient liquor to furnish the desired amount of dye.

Developing the Color

Resultant wet material without drying is then entered into a hot aqueous acid solution as the developing-bath. A sulfuric acid solution is generally preferred, although other mineral acids, such as hydrochloric, nitric, phosphoric and the like may be substituted therefor. Certain highly ionizable organic acids, such as the formic acid and the like, as noted above, will also give satisfactory results.

In general an acid concentration equivalent to about 2–6% aqueous sulfuric acid gives satisfactory results. A concentration of about 2.5–5% is preferred and is a good practice. It is also intended, without departing from the scope of this invention, that small amounts (of the order of 1–3%) of an alkali-metal salt such as common salt or Glauber's salt may be added to the developing-bath, if so desired.

The time required for color development will vary from about 0.5 to about 5 minutes, depending upon the concentration of dye in the pad-liquor. The development period should be so regulated as to keep the developing-bath essentially free of any color that might bleed off of the wet material during the initial stages of development. For pad-baths containing up to about 1.5% dye, from about one-half to about one minute in the developing-bath will generally be found satisfactory. For pad-baths containing from about 1.5% to about 3% of dye, some two to five minutes or longer may be required to keep the developing-bath relatively free of color.

The developing-bath is most useful when it is hot, of the order of from about 200°–220° F. An average in the range of about 210°–215° F. is preferred.

Removal of the Developing Liquor from the Dyed Material

The colored fibers are first rinsed with water to neutrality. If desired, this rinsing may be followed with soaping in 0.1% soap solution at 160–200° F. for five minutes, followed by another rinse. As noted above, the rinsing-soaping schedule is not critical nor does it form part of the claimed invention.

Drying

The drying operation is also conventional and may be carried out either as the last stage of a continuous-dyeing operation process, or the drying may be done in a separate unit.

In order to show the effect of the dyeing assistant the following examples were carried out without the dyeing assistant.

EXAMPLE 1

A 1-liter pad-bath is prepared using 15 grams of Acid Red 37, and
15 grams formic acid.

The dye is first pasted in a small amount of water and dissolved. The formic acid is then diluted with about twice its weight of water and added to the dye solution, after which the volume is brought to one liter by the addition of water. The pH of this pad-bath is about 2.

A developing-bath is then prepared by adding 50 grams sulfuric acid (concentrated) to about 500 ml. water, diluting to one liter and heating to the boil.

The test fabric is then passed through the pad-bath at room temperature, excess liquor is removed by squeeze rolls to about 100% wet pick-up and the wet fabric is then entered into the boiling developing-bath for one minute, removed, rinsed to neutrality, soaped in a 0.1% soap solution at 160–200° F., again rinsed and finally dried. Fabrics of wool and Fiber A were tested. In both cases only weak red dyeings are obtained, color does not penetrate the fibers and the fastness to light, washing and crocking are very poor, so poor that the dyed material would not be commercially acceptable.

EXAMPLE 2

Using the pad-bath, developing-bath and procedure of Example 1, test fabrics of fibers B, C, D, E and F are each subjected to the same continuous dyeing process described in Example 1.

Again, only a weak red dyeing is obtained in each instance, the fibers being poorly penetrated by the dye and the fastness to light, washing and crocking being commercially unacceptable.

EXAMPLE 3

Eight one-liter pad-baths are prepared as in Example 1, in each replacing the Acid Red 37 by 15 grams of one of the following dyes:

(a) Acid Orange 10
(b) Acid Blue 40
(c) Acid Red 182 (metalized)
(d) Acid Blue 78
(e) Acid Green 1
(f) Acid Blue 120
(g) Acid Yellow 23
(h) Direct Brown 95

A developing-bath consisting of aqueous 5% sulfuric acid is also prepared and brought to the boil. Fabrics of fibers A and B are entered into each of the pad-baths and processed exactly as in the procedure of Example 1.

Again, in every instance the pentration of the dye into the fiber is poor resulting in commercially unacceptable fastness to light, washing and crocking.

EXAMPLE 4

The procedure of Example 3 is repeated except the fibers are held in the developing-bath for three minutes. Penetration of the dye into the fibers is improved but still poor and the fastness to light, washing and crocking of the dyed pieces are below commercially acceptable standards.

In the following examples, a dyeing assistant is added to the pad-bath composition in accordance with the present invention.

EXAMPLE 5

A one-liter pad-bath is prepared using 15 grams Acid Red 37
15 grams dyeing assistant "A"
15 grams formic acid The dye is first pasted in a small amount of water and dissolved. Dyeing assistant "A" as used in this and in subsequent examples is prepared by dissolving 20 parts of dioctyl sodium sulfosuccinate and 20 parts of the reaction product of p-octyl phenol and 10 moles of ethylene oxide in 400 parts of methyl salicylate. This solution is then emulsified in 440 parts of water with stirring, forming an oil-in-water emulsion. 15 grams of this assistant are diluted with an equal amount of water and then added to the solution of dye. The formic acid is diluted with about twice its weight of water and added to the dye solution after which the volume is brought to one liter. The pH of this solution is about 2. A developing-bath consisting of aqueous 5% sulfuric acid is also prepared.

Fabrics of fibers A, B, C, D, E and F are then processed according to the procedure of Example 1. In the case of each fabric an excellent red shade is obtained. The dye is well penetrated into the fiber resulting in fastness to light, washing and crocking which are commercially acceptable. The same results are obtained when the formic acid is replaced by the equivalent amount of sulfuric acid.

Although the pad-bath in the preceding example is put together in a specific way, it is an advantage of our continuous dyeing compositions that the order of addition of the ingredients in the pad-bath is not critical.

It is another advantage that the process of the preceding example is applicable to fibers, yarns and fabrics that contain basic nitrogen, including the natural and synthetic protein fibers. This is exemplified in the following example.

EXAMPLE 6

Using the same pad-bath, developing-bath and procedure of Example 5, fabrics consisting of wool, mohair, alpaca, and silk are each passed through these baths and, after rinsing to the neutral state, soaping, again rinsing, and drying, excellent red shades are obtained, the fibers are well penetrated by the red dye, the dyed material has excellent fastness properties which meet the standards of commercial acceptability.

EXAMPLE 7

A one-liter pad-bath is prepared using 7.5 grams Acid Red 14.
7.5 grams formic acid
9.0 grams dyeing assistant "A"

The dye is first pasted with a small amount of water and dissolved. 7.5 grams formic acid are then added followed by 9.0 grams dyeing assistant A which is first diluted with an equal amount of water. The bath is then made up to one liter with water. A developing-bath is prepared by adding 25 grams sulfuric acid to 250 grams water, diluting to one liter and then heating to the boil. The developing-bath contains 2.5% acid.

Fabrics of fiber "A" and wool are then processed as in Example 1 except that the retention period in the developing-bath is reduced to one-half minute. Dyeing is very rapid, an excellent red shade is obtained that does not crock or bleed on hot pressing.

EXAMPLE 8

A piece of union-fabric consisting of fiber "A," fiber "E" and wool is dyed using the compositions and procedure of Example 7. A good union-dyeing is obtained.

EXAMPLE 9

A one-liter pad-bath is prepared using 12 grams of dye mixture
15 grams formic acid
15 grams dyeing assistant "A"

The dye mixture is prepared as follows to match a desired red shade:

14.0 grams Acid Blue 40
85.0 grams Acid Red 37
11.0 grams Acid Orange 10
5.0 grams Acid Yellow 17

Twelve grams of the dye mixture is dissolved in a small amount of water. The formic acid is diluted with about twice its weight of water and added to the dye solution. The dyeing assistant is diluted with an equal amount of water and added to the dye solution. Water is then added to make one liter. A developing-bath is prepared containing 2.5% sulfuric acid and is heated to the boil. Fiber "A" in the form of raw stock is wet with the padliquor, the excess reduced to about 100% pick-up by squeeze rolls, and is then developed for one minute in the boiling developing-bath.

An excellent red shade is obtained, the fibers are well penetrated by the dye and the crimp in the fiber is substantially unchanged.

EXAMPLE 10

Another one-liter pad-bath is prepared to match a different shade using the same dyes as in the previous example, but in a different proportion 6 grams of dye mixture
15 grams formic acid
15 grams dyeing assistant A The dye mixture is prepared from 17.0 grams Acid Blue 40
26.0 grams Acid Red 37
16.0 grams Acid Orange 10
13.0 grams Acid Yellow 17

Six grams of dye mixture is dissolved in a small amount of water, the formic acid and dyeing assistant are diluted and added to the dye solution and the solution is made up to one liter of pad-bath. Raw stock of fiber "A" is padded in this solution and the color developed as in Example 9. An excellent brown shade is obtained. Dye is well penetrated into the fiber causing good fastness properties to be obtained which are commercially acceptable.

EXAMPLE 11

Using the procedure for preparing a dyeing assistant shown in Example 5, several dyeing assistants are prepared, the methyl salicylate of assist "A" being replaced by the following materials:

Dyeing assistant "B" from a corresponding amount of methyl benzoate.
Dyeing assistant "C" from a corresponding amount of isopropyl benzoate.
Dyeing assistant "D" from a corresponding amount of butyl benzoate.
Dyeing assistant "E." This assistant is prepared from methyl p-hydroxybenzoate (a solid) which is first dissolved in a solvent before emulsification. Fifty parts of the methyl p-hydroxybenzoate are dissolved in 150 parts of butanol. 2.5 parts of disodium dioctyl sulfosuccinate are then dissolved in the butanol solution after which 2.5 parts of the reaction product of p-octyl phenol and 10 moles ethylene oxide are dissolved in the butanol. The butanol solution is then added to an equal weight of water with stirring until an oil-in-water emulsion is formed.

Four one-liter pad-baths are prepared as in Example 5 substituting, however, dyeing assistant "B," "C," "D," and "E," respectively, for dyeing assistant "A." Four samples of fiber B fabric are padded, one sample in each bath, the excess pad-liquor removed to 100% pick-up and color is then developed and finished as in Example 5. An excellent red shade is obtained on each of the four pieces. They are well penetrated by the dye, have good fastness properties and the dyeings are commercially acceptable.

UTILIZATION OF TYPE B PAD-BATHS

*Composition of the Pad-Bath*

Without departing from the scope of our invention and when using anionic dyes for coloring certain modified acrylic fibers, i.e., such as those containing vinyl or polyvinyl pyrrolidone, the acid in the pad-bath is replaced with 1-3% of sodium chloride. When this is done, the developing-bath will consist essentially of a substantially saturated solution of sodium chloride. As will be understood by those skilled in the art sodium chloride may be substituted by other substantially-neutral alkali-metal salts. It is desirable that the salt be substantially free of alkaline earth metal salts. The term "saturated" as used in defining these compositions and as will be understood by those skilled in the art means that they may not be completely saturated with the salt. The term "substantially-saturated" is therefore used to denote a sodium chloride content of some 30% to 39%, usually at least 32%.

It is an advantage of our pad-bath and developing-bath compositions that the strike is very rapid, in many cases practically instantaneous.

It is a further advantage that the process and compositions cause the fibers to be dyed levelly, giving solid shades free of heathery or skittery effects, complete penetration of the fiber with resultant maximum fastness to light, washing and crocking, and with no discernable physical damage to the fiber as the crimp is unaffected.

In the following examples, application of anionic dyes to the synthetic, hydrophobic fibers modified with vinyl or polyvinyl pyrrolidone such as fibers G and H, the general procedure of the previous Examples 1–11 is employed with the following exceptions:

(1) The acid is omitted from the pad-liquor and 1–3% of a suitable salt, usually sodium chloride, is added.
(2) The developing-bath consists of a hot (200°–220° F.) aqueous solution of common salt having a concentration of some 30% to 39%.

Again, for purposes of comparison the following group of examples contains no dyeing assistant.

EXAMPLE 12

A master pad-bath is prepared as follows:

24.0 grams of the half-cobalt complex of the dye Acid Yellow 114, equal to 1% on the weight of the pad-liquor;
6.0 grams of the half-chrome complex of the dye Acid Brown 19 equal to ¼% dye on the weight of the pad-liquor; and
21.6 grams of sodium chloride, equal to a concentration of about 0.9%.

The dye is first pasted with a small quantity of water and then made up to 1500 grams with additional water; the salt is dissolved in about 800 grams of water and added to the dye solution, and finally the pad-bath is made up to about 2400 grams. The master bath is then divided into six pad-baths of about 400 ml. each. One of the six pad-baths is left at room temperature, another is heated to 100° F., the third to 110° F., the fourth to 120° F., the fifth to 140° F., and the sixth to 160° F. Portions of Fiber G in the form of raw stock and also in the form of yarn are wet out in each of the six baths, and squeezed between rolls retaining about 100% pickup. The wet, padded material from each of the six baths is divided into three parts (a total of 18 samples). One sample from each of the six different temperature pad-baths is developed for one minute in a boiling 34% aqueous sodium chloride developing-bath. One sample from each pad-bath is treated in the boiling sodium chloride developing-bath for about 2.5 minutes. The remaining six samples are developed in the same developing-bath for about 5 minutes. The 18 samples are rinsed until free of salt, soaped in 0.1% soap solution at 160° F. for five minutes, again rinsed, and finally dried. Practically no color remained on the fiber although there was a very weak staining in some cases.

EXAMPLE 13

A master pad-bath is prepared using the following:

9.0 grams of the half-chrome complex of the dye 2-(2-hydroxy - 4 - sulfamidophenylazo) - 5,8 - dichloro - 1 - napthol, equal to about ⅜% dye on the weight of the pad-bath;
1.2 grams of the half-cobalt neutral complex of the dye Acid Yellow 114 (0.05%) on the weight of the pad-bath;
1.2 grams of the half-chrome neutral complex of the dye Acid Black 60;
18.0 grams of sodium chloride (¾% on weight of bath).

The master pad-bath is prepared as in Example 12, water being added to make a total pad-bath volume of about 2400 grams. Samples comprised of fibers G and H are each treated by the same procedure of the preceding Example 12, padding at six different temperatures and developing for about 1.0, 2.5 and 5 minutes. All 18 samples of fiber H are dyed a weak green shade, those of fiber G only slightly stained.

In the following examples the advantages of using the dyeing assistants of the present invention are clearly shown by comparison with the results obtained in Examples 12 and 13.

EXAMPLE 14

A master pad-bath is prepared exactly as in Example 12 except that there is added thereto 36.0 grams of dyeing assistant "A." The exact procedure of Example 12 is repeated in all details using this bath containing the assistant. The results follow:

(1) All 18 parts are dyed a level gold shade.
(2) The parts that are padded at temperatures above room temperature show some increase in strength, levelness and penetration into the fiber as the temperature of padding increases to 160° F.
(3) The parts that are developed five minutes are slightly stronger, more level and more deeply penetrated than the dyed portions that are developed for only one minute.

EXAMPLE 15

A master pad-bath is prepared, exactly as in Example 13, except that 36 grams of dyeing assistant A is added thereto. Again the procedure of Example 13 is repeated exactly. Fibers G and H are used. All of the 18 samples of each fiber are dyed good level green shades, fiber H being dyed a slightly heavier shade than fiber G. The samples padded at higher temperatures and developed for longer periods of time have better color value, are somewhat more level and are slightly better penetrated than those portions that are padded at the lower temperature and developed for one minute. All are dyeings which are commercially acceptable.

UTILIZATION OF TYPE (C) PAD-BATHS

The application, by the present continuous process, of dyes of group (II) in which the color is in the positively charged portion of the molecule to materials containing basic nitrogen requires some modification of the constitution of the pad-bath and developing-bath compositions from those discussed above. Otherwise the general procedure used is much the same. Without departing from the general scope of our invention, cationic dyes of group (II) above may be applied to various types of synthetic fibers containing basic-nitrogen groups, especially those such as are illustrated by fibers A, B, C and D.

Composition of the Pad-Bath

A pad-bath of this type contains a cationic dye and a dyeing assistant, the latter being the same as those discussed above. As to the amount of dye, usually from about 0.5 to about 3.0 weight percent of the cationic dye will produce the shade required. As in the pad-baths of the types discussed above, use of the dyeing assistant is highly important. In the amount, the dyeing assistant is used in accordance with the discussion above. Padding, removal of excess pad-bath liquor and amount of wet pick-up are all practiced as in the usage of the previously-discussed types of pad-baths. So far as the pad-bath and its use are concerned, those of this type (C) differ from those of types (A) and (B) in that:

(1) The anionic dye of group (I) is replaced by a cationic dye of group (II).
(2) The pad-bath contains no added acid and is essentially neutral.

Typical dyes illustrative of those of group (II) are basic dyes such as Basic Yellow 2, Basic Orange 1, Basic Red 1, Basic Blue 9, Basic Green 4, the so-called "acrylic" dyes, and the like.

Color Development

The padded wet material is then entered, without drying, into a hot (200°–220° F.) solution of a salt which has a buffering action between about pH 9.5 and a pH of about 7. Salts of this type are exemplified by alkali phosphates such as the mono-, di-, and tri-sodium phosphates, usually and preferably as mixtures, sodium tripolyphosphate and the like. Concentrations of from about 3.5 to about ten percent of the developing salt may be used to obtain satisfactory results. Amounts from about four to about 7.5 percent being usually employed.

Again the time required for developing the color depends upon the concentration of the dye in the pad-liquor and may vary from about one-half to about ten minutes. For fibers containing up to about 1.5% dye in the pad-liquor, 0.5–1.5 minutes in the developing-bath has proved to be satisfactory. When the pad-liquor contains concentrations of dye higher than 1.5% longer times are advantageous, of the order of 2–5 minutes. The length of time should be so regulated that no color bleeds from the wet material thereby discoloring the developing-bath.

The treatment of the material after developing consists of removal of the developing-liquor, soaping, if desired, and drying, as in the procedures discussed above. To illustrate the importance of the use of the dyeing assistant, it was omitted in the following example.

EXAMPLE 16

A one-liter pad-bath is prepared by pasting 7.5 grams of the acrylic dye described in Example 1 of U.S. Patent 2,864,813 (col. 3, lines 51–74) with a small quantity of water and then making up to 1000 ml.

The developing-bath is prepared by dissolving 50 grams of sodium tripolyphosphate ($Na_5P_3O_{10}$) in about 500 ml. water, bringing the volume to one liter and heating to the boil.

Separate pieces of material composed of fibers A, B, C and D, respectively, are wet out in the pad-liquor, the excess removed by passing the wet material through a pair of squeeze rolls to give about 100% pick-up (owf.) and then, without drying, developed for about 1 minute in the boiling 5% sodium tripolyphosphate developing-bath. The developed material is then rinsed, soaped for about 5 minutes in a 0.1% soap solution at 140° F., again rinsed and dried. The pieces are only slightly stained and would be commercially unsatisfactory.

EXAMPLE 17

Twenty one-liter pad-baths are prepared, each containing one of the following ten dyes. For each dye, two baths are prepared, one containing 7.5 grams of the dye, the other containing 15 grams.

(1) Basic Yellow 2
(2) Basic Orange 1
(3) Basic Green 1
(4) Basic Green 4
(5) Basic Blue 9
(6) Basic Blue 26
(7) Basic Violet 1
(8) Basic Violet 3
(9) Basic Violet 10
(10) Basic Violet 26

Samples comprising portions of fiber A and of fiber B are then padded in each of the resultant 20 pad-baths, the excess liquor is removed as before to give a pick-up of about 100% (owf.) and then, without drying, the padded samples are passed through a developing-bath containing 5% boiling sodium tripolyphosphate for about 2 minutes. The pieces are then rinsed free of salt, soaped, again rinsed, and dried. The dried pieces are only slightly stained and as dyeings are completely unacceptable.

In the following group of examples a dyeing assistant is added to the pad-bath in accordance with this invention. By comparison with Example 17, the advantages of the present invention are clearly demonstrated.

EXAMPLE 18

A one-liter pad-bath is prepared as follows:

7.5 grams of the dye of Example 1 of U.S. Patent 2,864,813.

15.0 grams dyeing assistant "A."

The dye is pasted with a small quantity of water, the dyeing assistant is diluted with about an equal quantity of water, added to the dye and the total volume adjusted to one liter. A developing-bath is prepared by dissolving 50 grams of sodium tripolyphosphate in water, bringing the volume to 1000 ml., and heating to the boiling point.

Samples containing fibers A, B, C and D, respectively are wet out in the pad-bath, the excess removed with squeeze rolls to give a pick-up of about 100% (owf.) and then, without drying, are developed for about one minute in the boiling developing-bath. The color develops very rapidly. The pieces are then rinsed free from salt, soaped in 0.1% soap solution at 140° F. for about 5 minutes, again rinsed, and dried.

All the pieces are well colored, the dye is penetrated into the fibers and the dyed pieces would be commercially acceptable.

EXAMPLE 19

Four one-liter pad-baths are prepared as in the previous Example 18 except the following changes are made:

(a) Dyeing assistant "B" is used instead of "A";
(b) Dyeing assistant "C" is used instead of "A";
(c) Dyeing assistant "D" is used instead of "A";
(d) Dyeing assistant "E" is used instead of "A."

Samples consisting of fibers A, B and C, respectively, are wet out in each of the four pad-liquors and are squeezed to remove the excess pad-liquor to give a pick-up of about 100% (owf.). Then, without drying, the samples are developed in boiling 10% aqueous solutions of sodium tripolyphosphate for about one minute, after which they are rinsed free of salt, soaped in 0.1% soap solution at 140°–150° F. for about 5 minutes, again rinsed, and dried. The shades are similar to those obtained in Example 18 on the respective pieces, the dye is well penetrated into the fibers and the dyeing is commercially acceptable.

EXAMPLE 20

Twenty one-liter pad-baths are prepared as in Example 17 except that 15 grams of dyeing assistant "A" is added to each bath. Pieces of fibers A, B and C, respectively, are wet out in each bath, squeezed to give a pick-up of about 100% (owf.) and then, without drying, are developed for two minutes in boiling alkali phosphate solutions having a pH not greater than about 9.5 and not lower than about 7. The colored material is then rinsed, soaped at 140° F. for 5 minutes in 0.1% soap solution, again rinsed, and dried. Each of the pieces is dyed a uniform shade, the fibers are well penetrated by the dye and the pieces would be commercially acceptable.

We claim:

1. A continuous dyeing process adapted for dyeing basic nitrogen containing material, selected from the group consisting of the natural and synthetic protein, "nylon" and "acrylic" fibers, with an anionic dye which process comprises the steps of: passing said material into and through an aqueous acidic pad-bath composition maintained at about ambient room temperature, said composition consisting of said dye in a colored, oil-in-water type emulsion wherein the inner phase is comprised of at least one dyeing assistant selected from the group consisting of toluene, xylene, butanol, p-dichlorbenzene, trichlorbenzene and the lower alkyl esters of carbocyclic, aromatic, monocarboxylic acids having not more than two carbocyclic rings; maintaining the period of dwell until said material is wet out; removing the excess pad-bath liquor; passing the resultant wet material into and through an aqueous, acidic, developing-bath composition; maintaining the developing-bath at a temperature in the range of from about 200° to about 220° F.; maintaining a period of dwell less than about ten minutes but sufficient to develop the color; and separating resultant colored material from the said developing-bath.

2. A process according to claim 1 in which said material is a fibrous textile material.

3. A process according to claim 1 in which said pad-bath contains from about 0.5 to about 2.5 percent of the weight of the bath of a highly-ionizable acid.

4. A process according to claim 3 in which said acid is formic acid.

5. A process according to claim 1 in which said aqueous, acidic, developing-bath has an acidic content equivalent to that of an aqueous sulfuric acid solution of from about two to about six percent sulfuric acid.

6. A process according to claim 5 in which said acid is sulfuric acid.

7. A process according to claim 5 in which said acid is formic acid.

8. A process according to claim 1 in which said developing-bath also contains from about one to about three percent of a highly-soluble, substantially-neutral alkali-metal salt.

9. A continuous dyeing process adapted for dyeing basic-nitrogen containing material, selected from the group consisting of the natural and synthetic protein, "nylon" and "acrylic" fibers, with an anionic dye which process comprises the steps of: passing said material into and through an aqueous salt pad-bath composition maintained at about ambient room temperature, said composition consisting of said dye in a colored, oil-in-water type emulsion containing from about one to about three weight percent of a highly-soluble, substantially-neutral, alkali-metal salt and wherein the inner phase is comprised of at least one dyeing assistant selected from the group consisting of toluene, xylene, butanol, p-dichlorbenzene, trichlorobenzene and the lower alkyl esters of carbocyclic, aromatic, monocarboxylic acids having not more than two carbocyclic rings; maintaining the period of dwell until said material is wet out; removing the excess pad-bath composition; passing the resultant wet material into and through an aqueous, developing-bath composition containing from about 30 to about 39 weight percent of a highly-soluble, substantially-neutral, alkali-metal salt; maintaining the developing-bath at a temperature in the range of from about 200° to about 220° F.; maintaining the period of dwell less than about ten minutes but sufficient to develop the color; and separating resultant colored material from the said developing-bath.

10. A process according to claim 9 in which said material is a fibrous textile material.

11. A process according to claim 9 in which said pad-bath salt is sodium chloride.

12. A continuous process for dyeing "modacrylic" material with cationic dyes which comprises the steps of: passing said material into and through a substantially-neutral aqueous pad-bath composition maintained at about ambient room temperature, said composition consisting of said dye in a colored, oil-in-water type emulsion wherein the inner phase of said emulsion comprising at least one dyeing assistant selected from the group consisting of toluene, xylene, butanol, p-dichlorbenzene, trichlorbenzene and the lower alkyl esters of carbocyclic, aromatic, monocarboxylic acids having not more than two carbocyclic rings; maintaining the period of dwell until said material is wet out; removing the excess pad-bath liquor; passing the resultant wet material into and through an aqueous, alkaline, developing-bath composition; maintaining the developing-bath at a temperature in the range of from about 200° to about 220° F.; maintaining a period of dwell less than about ten minutes but sufficient to develop the color; and separating resultant colored material from the said developing-bath.

13. A process according to claim 12 in which said material is a fibrous textile material.

14. A process according to claim 12 in which said developing-bath composition comprises a buffered alkaline bath having a pH not exceeding about 9.5 nor less than about 7.5.

15. A process according to claim 14 in which said developing-bath composition contains from about four to about 7.5 percent by weight of the bath of an alkali-metal phosphate.

16. A process according to claim 15 in which said alkali-metal phosphate is sodium tripolyphosphate.

References Cited in the file of this patent

UNITED STATES PATENTS

| | | |
|---|---|---|
| 2,387,200 | Walter | Oct. 16, 1945 |
| 2,881,045 | Mecco et al. | Apr. 7, 1959 |
| 2,888,313 | Mautner | May 26, 1959 |
| 2,893,816 | Tsang et al. | July 7, 1959 |
| 2,934,396 | Charle et al. | Apr. 26, 1960 |